June 18, 1968 — J. P. HESTER — 3,388,804
BEVERAGE BREWING BASKET
Filed Feb. 2, 1966
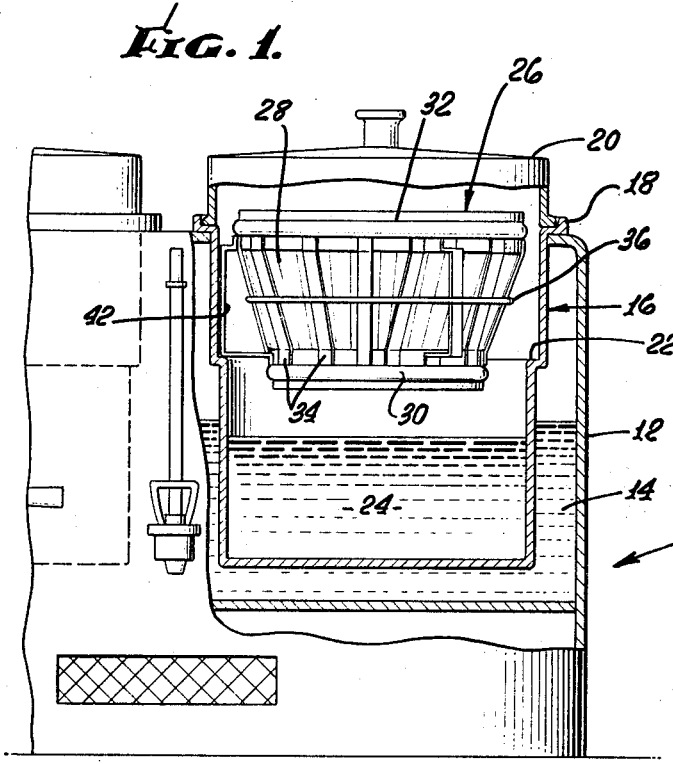
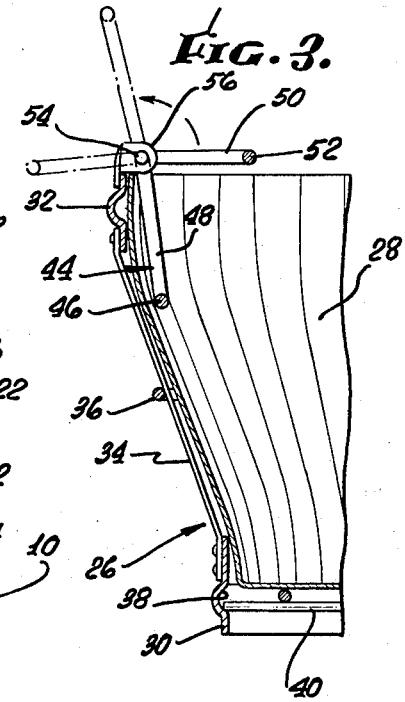
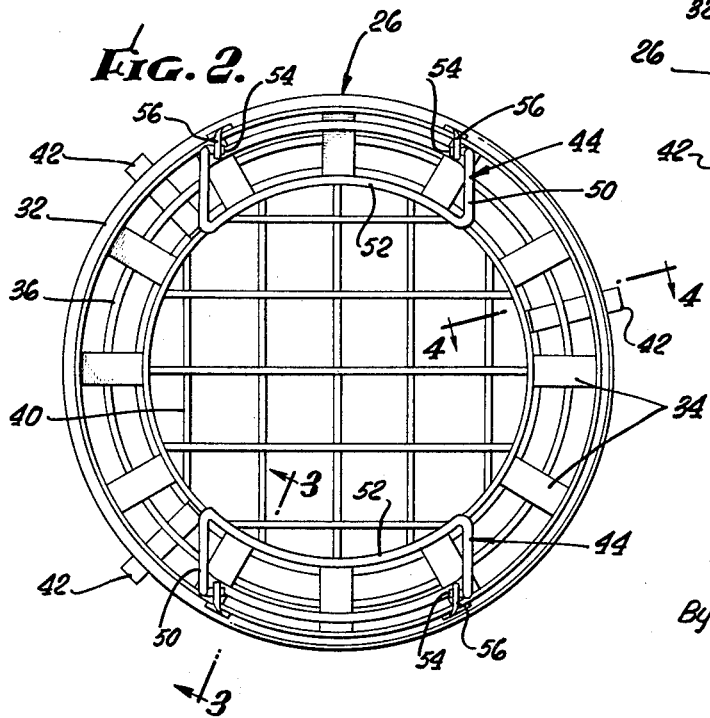
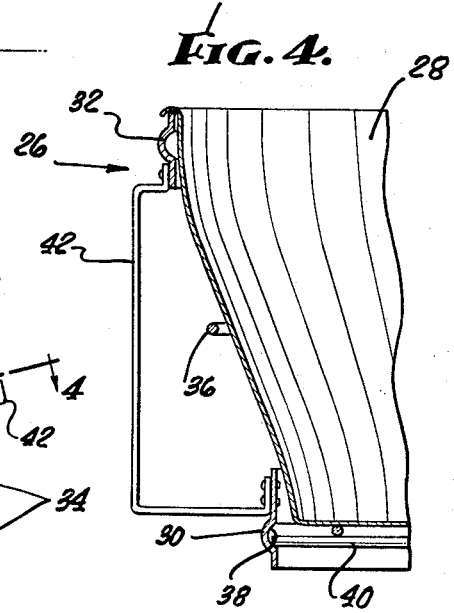
INVENTOR.
JOHN P. HESTER
BY Huebner & Worrel
ATTORNEYS.

United States Patent Office 3,388,804
Patented June 18, 1968

3,388,804
BEVERAGE BREWING BASKET
John P. Hester, Lakewood, Calif., assignor to Wilbur Curtis Co., Inc., Los Angeles, Calif., a corporation of California
Filed Feb. 2, 1966, Ser. No. 524,578
3 Claims. (Cl. 210—470)

ABSTRACT OF THE DISCLOSURE

A beverage brewing basket having a cupped sheet filter element supported therein for holding coffee grounds or the like through which hot water is to be poured for brewing coffee or the like, wherein the filter element is supported by a plurality of pivoted retainer units regularly spaced about the side wall of the basket. The pivoted retainer units are normally weight-biased against the filter element to hold it in place, and provide handle means for the basket.

---

The present invention relates to beverage brewing machines such as coffee brewing urns employed in restaurants, and it relates more particularly to a basket or cartridge adapted to contain ground coffee beans or other beverage-producing material insuch an urn and through which hot water is poured to produce the brewed coffee or other beverage.

Urns of the type used in restaurants for brewing and storing coffee originally utilized a French drip basket for containing the coffee grounds, and this consisted primarily of a spun aluminum side wall with a screen bottom. The French drip type of basket was replaced by a basket having a solid side wall but a grid type of bottom, with the coffee grounds being contained in a cloth bag deposited in the basket. However, such cloth bags could only be used three or four times, and even then presented a difficult problem of cleaning, and had to be kept soaking when not in use.

Recently, porous filter paper elements have replaced the cloth bags to a certain extent, these paper filter elements having a configuration generally like that of a cupcake paper, only much larger, and nesting within a basket having an open grid type of bottom similar to the basket used in connection with the cloth bag. Such porous paper filter elements provide relatively free flow of the brewed coffee therethrough, without restriction of the important flavor-producing ingredients, while at the same time substantially completely eliminating the passage of objectionable coffee granules therethrough into the storage container for the brewed coffee. Such porous paper filter elements are preferably made of a cotton fiber type of paper, and are economical to use, being so inexpensive that they can be thrown away after each use, and being an important labor saving device.

However, the porous paper type of filter element has several problems associated with its use which have heretofore prevented it from being entirely satisfactory for its intended use. A particularly serious problem is that the edges of the paper had a tendency to fold or bend inwardly away from the side wall of the basket when the coffee grounds were poured into the cupped filter paper, and particularly when the hot water was poured therein. This inward folding restricted the access opening into the filter paper cup, so that it frequently became very difficult for a waitress or other operator to pour hot water into the proper place for brewing the coffee. Another problem associated with beverage brewing baskets of the type utilizing porous paper filters was that it was difficult to manipulate such baskets; i.e., it was awkward to remove and replace such baskets from their operative positions in the urns. Previous attempts to apply handle devices to such beverage brewing baskets resulted in obstructions which prevented the lids from properly seating over the kettle portions of the urns, or which made it difficult to seat the paper filter elements in the baskets, or both.

In view of these and other problems in the art, it is an object of the present invention to provide a beverage brewing basket for a coffee urn or the like which employs a disposable porous paper filter unit, and which includes novel retention means for securing the side wall portion of the paper filter unit against the side wall of the basket, so that the paper filter unit will not fold inwardly and thereby obstruct the proper functioning of the apparatus.

Another object of the present invention is to provide a novel beverage brewing basket of the character described wherein the retention means for securing the paper filter unit in its operative position is gravity biased so as to avoid any need for springs and to make the device durable and foolproof in operation.

A still further object of the invention is to provide a novel beverage brewing basket of the character described wherein the gravity-biasing means for the structure which retains the paper filter element in its operative position comprises handle means which is completely out of the way of the lid of the coffee kettle in which the brewing basket is nested when the retention means is operative to hold the paper filter unit in position, and which serves as handle means both for pivoting the retention means out of the way for removing and replacing the disposable filter element, and as handle means for removal and replacement of the brewing basket itself from the coffee kettle. Additionally, the handle means pivots with the retention means so as to be automatically moved completely out of the way when the retention means is shifted from its operative position to an open position in which the paper filter element can be removed and replaced.

Further objects and advantages of the present invention will appear during the course of the following part of the specification, wherein the details of construction and mode of operation of a presently preferred embodiment are described with reference to the accompanying drawing, in which:

FIGURE 1 is a fragmentary elevational view of a multi-kettle coffee urn, with one of the kettles thereof shown in vertical section, and the beverage brewing basket in the kettle shown in elevation.

FIGURE 2 is a top plan view illustrating the beverage brewing basket of the present invention without the porous paper filter unit.

FIGURE 3 is a vertical section taken on the line 3—3 in FIGURE 2, with one of the porous paper filter units disposed in the basket.

FIGURE 4 is a vertical section taken on the line 4—4 in FIGURE 2, also with the addition of one of the porous paper filter units in the basket.

Referring to the drawings, FIGURE 1 illustrates a generally conevntional coffee brewing and storage urn 10 which includes as a part thereof a vessel 12 serving as a reservoir for hot water 14. This hot water 14 may be drained out from a spigot and poured through the beverage brewing basket to extract the flavor ingredients from the coffee grounds, and the hot water 14 also serves to keep the brewed coffee that is in the coffee kettle at the proper temperature.

One or more coffee kettles 16 are removably mounted in the urn 10, one of the kettles 16 being shown in detail in FIGURE 1. The kettle 16 extends down into the vessel 12 of the urn through an opening in the top thereof, and is seated by means of an outwardly turned annular flange 18 at the top of kettle 16. The kettle lid 20 rests on the flange 18 and is centered by an upturned peripheral lip of the flange. The kettle 16 is stepped intermediate its top and bottom to provide an upwardly directed inner shoulder 22 which is adapted to support the beverage brewing basket of the present invention. The bottom portion of the kettle is adapted to receive and store the brewed coffee or other beverage 24 therein.

The beverage brewing basket 26 according to the present invention is of a generally open, webbed construction and is adapted to support a paper filter element 28 which serves to hold the ground coffee beans for the brewing operation, and which additionally serves to effectively filter the coffee grounds out of the brewed coffee 24. The filter element 28 is a throwaway item which can be removed and replaced after each coffee brewing cycle, and the filter element is shaped generally like a very large cupcake paper, being generally flat at the bottom and having an upwardly and outwardly flaring side wall which may be pleated or accordioned with generally vertical folds so that it can be formed out of flat stock and will tend to retain its shape.

In its presently preferred form, the beverage brewing basket 26 has a side wall comprising lower and upper annular bands 30 and 32 respectively, which are generally axially aligned and vertically spaced, with a number of generally upwardly extending strips 34 regularly spaced around the bands 30 and 32 and extending from the lower band 30 to the upper band 32. The upper band 32 has a somewhat larger diameter than the lower band 30 in the preferred configuration of the basket 26, whereby the side wall strips 34 will flare somewhat upwardly and outwardly. A reinforcing ring 36 may be engaged about the strips 34 intermediate the bands 30 and 32.

The lower band 30 is provided with an inwardly facing annular groove 38 within which the bottom structure of the basket 26 is supported. This bottom structure comprises grid means 40 preferably consisting of two sets of grids which are crossed at right angles and are welded together. This type of bottom structure of the basket permits the free flow of brewed coffee downwardly through the porous paper filter element 28, and a series of pockets will be formed in the bottom of the filter unit 28 between the crossed rods of the grids from which the brewed coffee will drip.

A plurality of locating ribs 42, preferably three in number, are equally spaced about the periphery of the basket 26, being fixedly secured to the annular bands 30 and 32. These locating ribs 42 will seat on the upwardly facing annular shoulder 22 in the kettle 16 to define the vertical positioning of the basket 26 in the kettle, and are engageable against the upper annular wall of the kettle to provide generally axial centering of the basket 26 in the kettle.

According to the present invention the beverage brewing basket 26 is provided with a plurality of pivoted retainer structures 44 which have a generally inverted L-shaped configuration. In the specific embodiment of the invention illustrated in the drawings two of the pivoted retainer structures 44 are provided in diametrically opposed relationship. Each of the retainer structures 44 includes an arcuate retainer bar 46 which, in the operative position of the basket, is disposed below the upper annular band 32, and which is adapted to engage against the inside of the wall of the paper filter element 28 so as to hold the wall of the filter element against the strips 34 forming the wall of the basket 26. The arcuate shape of the retainer bar 46 has a curvature similar to the curvature of the side wall of the basket proximate the retainer bars 46.

In the form of the invention illustrated in the drawing, the retainer structures 44 are constructed principally of heavy wire or light bar stock which is suitably bent to the configuration of the retainer structures. When so consructed, each of the retainer structures 44 bends upwardly at the ends of the arcuate retainer bar 46 to provide upwardly extending, generally parallel legs 48, and then the stock is sharply inwardly bent at the tops of the legs 48 to provide generally parallel, horizontal arms 50. The inner ends of the arms 50 are connected by a handle member 52 which is spaced inwardly from the side wall of the basket and is proximate the level of the upper edge of annular band 32. Preferably, the handle member 52 is curved so as to generally conform to the curvature of the basket.

Generally horizontal, opposed, axially aligned trunnions 54 are integrally mounted on opposite sides of the retainer structure 44 proximate the junctures between the legs 48 and arms 50. These trunnions 54 are pivotally supported in respective tabs or ears 56 which are fixedly secured to the upper annular band 32 and extend upwardly and inwardly therefrom.

The pivoted retainer structures 44 are shown in FIGURE 2 and in solid lines in FIGURE 3 in their lowered or operative positions for positively holding the upwardly extending portion of the porous paper filter element 28 against the side wall of the basket. The arcuate retainer bar 46 engages the filter element 28 and is biased in an outward direction against the filter element 28 by gravitational force on the handle member 52 and associated horizontal arms 50 which actually form a part of the handle structure. This biasing force is reliable, not depending upon the use of springs, positively holding the side portions of the filter element 28 spread outwardly against the side wall of the basket so that the upper edges of the filter paper cannot fold toward each other and thereby interfere with the proper operation of the basket, as by interfering with the entry of coffee grounds therein or by interfering with the pouring of hot water into the basket. In this position of the handle member 52 and arms 50 wherein it biases the retainer bar 46 outwardly by a clockwise torque as viewed in FIGURE 3 resulting from the weight of the handle 52 and arms 50, the handle and arms are entirely out of the way of the lid 20, whereby the lid 20 can be properly seated against the flange 18 of the kettle.

All that is required to remove and replace the filter element 28 is to grasp both of the handles 52 and pivot the retainer structures 44 upwardly and outwardly. Thus, the retainer structure 44 as shown in FIGURE 3 will be pivoted anticlockwise from the solid line position to the phantom position. This pivotal movement will move both the handle and retainer portions of the retainer structure 44 upwardly out of the way of the filter element 28 so that it can be removed and replaced by a new filter element, at which time the retainer structure 44 may be pivoted clockwise back to its solid line position of FIGURE 3 for securing the side wall portion of the new filter element in its proper position.

The handle members 52 not only provide properly positioned weights for biasing the retainer bars 46 against the filter element and handles for pivoting the retainer structures 44 into and out of their operative positions, but the handle members 52 serve the further function as lifting handles for lifting the entire basket 26 to permit removal of the basket from the kettle 16 and replacement of the basket back in the kettle 16. In this manner, the basket 26 can be washed, and if desired the basket can be lifted out of the kettle for removing and replacing the filter element 28 and for pouring the ground coffee beans into the filter-lined basket.

It will be noted that in the phantom position in FIGURE 3 the weight balance of the retainer means has shifted sufficiently far to the left so that the retainer means will tend to remain open when it is shifted to its fully open position.

While the present invention has been shown and described herein in what is conceived to be the most practical and preferred embodiment, it is recognized that departures may be made therefrom within the scope of the invention, which is therefore not to be limited to the details disclosed herein, but is to be afforded the full scope of the claims.

I claim:
1. In combination, a basket for use in a beverage brewing urn and a cupped sheet filter element supported therein for holding particulate material through which hot water is to be poured for brewing a beverage, said basket comprising a liquid-permeable bottom wall and a side wall extending upwardly therefrom to define a generally cup-shaped basket structure within which the cupped filter element is nested, a plurality of retainer units pivotally mounted on said side wall near the top thereof at substantially regularly spaced intervals about the side wall, each of said retainer units normally projecting downwardly from its pivoted mounting adjacent the inwardly facing surface of said side wall in a closed position wherein it will engage against the inside of the cupped sheet filter element in the basket to hold the side of the filter element outwardly against the side wall of the basket, each of said retainer units being constructed to be pivoted inwardly and upwardly from its said closed position to an open position wherein it is spaced substantially from the side wall of the basket to permit removal and replacement of said filter element, and biasing means connected to each of said retainer units normally biasing the respective said retainer unit toward its closed position, said biasing means for each retainer unit comprising weight means fixedly secured to the retainer unit so as to pivot with the retainer unit, said weight means being generally inwardly horizontally offset from the pivotal mounting of the retainer unit when the retainer unit is proximate its closed position so that the force of gravity on said weight means will normally apply a torque to said retainer unit in the closing direction.

2. A basket as defined in claim 1, wherein said weight means is generally outwardly horizontally offset from the pivotal mounting of its respective said retainer unit when the retainer unit is proximate its open position so that the retainer unit will tend to remain open of its own weight when it is moved to its said open position.

3. A basket as defined in claim 1, wherein said weight means comprises handle structure adapted for manual engagement to pivot its respective said retainer unit and for lifting said basket.

References Cited

UNITED STATES PATENTS

| | | | |
|---|---|---|---|
| 286,813 | 10/1883 | Haskell | 210—480 X |
| 526,331 | 9/1894 | Tobin | 210—478 X |
| 723,091 | 3/1903 | Webb et al. | 210—474 X |
| 1,562,911 | 11/1925 | Ott | 210—474 X |
| 1,650,317 | 11/1927 | Blunck | 210—477 X |
| 1,786,500 | 12/1930 | McGonigal | 210—474 |

FOREIGN PATENTS

| | | |
|---|---|---|
| 839,552 | 5/1952 | Germany. |
| 17,404 | 2/1899 | Great Britain. |

REUBEN FRIEDMAN, *Primary Examiner.*

W. S. BRADBURY, *Assistant Examiner.*